United States Patent Office 3,340,039
Patented Sept. 5, 1967

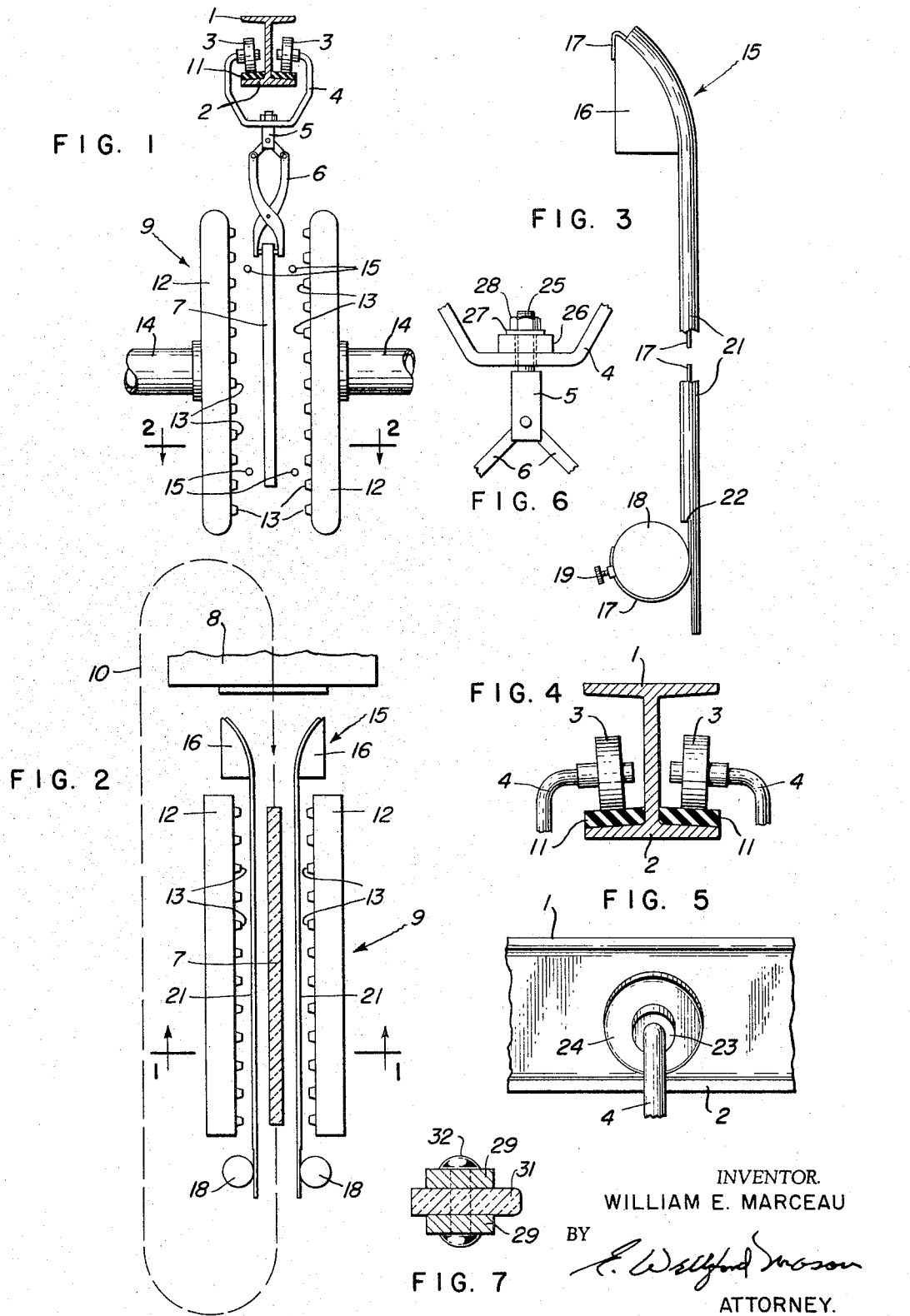

3,340,039
GLASS TEMPERING APPARATUS WITH RESILIENT SHEET SUPPORT MEANS
William E. Marceau, Havertown, Pa., assignor to Selas Corporation of America, a corporation of Pennsylvania
Filed Oct. 31, 1963, Ser. No. 320,374
3 Claims. (Cl. 65—348)

The present invention relates to the tempering of sheet glass, and more particularly to means to move a sheet of glass smoothly between the air blasts that are used to temper the glass and hold them accurately in position.

In the art of tempering glass, the glass is heated to above its annealing range and then is rapidly cooled. The cooling is usually accomplished by blowing jets of cool air against opposite surfaces of the glass, with the jets frequently being moved through a path parallel to the glass surface to obtain complete coverage thereof. The glass sheet must be moved smoothly from before being heated until after passing between the set of jets, and must be held accurately while it is being cooled in order to obtain a good temper pattern.

The glass is supported by tongs while it is being heated, and, while it is so supported, is moved from the furnace to the quench. Since the glass is practically at its softening temperature, its movement must be smooth to prevent the tongs from breaking the glass. Also the glass, in sheet form, must be kept from swinging as it is moved into the quench and during quenching so that the air jets will strike it evenly from opposite sides.

It is an object of the invention to provide means to move a sheet of glass smoothly and without vibration through a path while the glass is being tempered.

It is a further object of the invention to provide means to hold a sheet of glass accurately in position while it is moving into a quench apparatus, and while the glass is being quenched.

In carrying out the invention, a glass sheet is moved along a path by means of a carriage riding on a track. Resilient means are provided between the track and carriage to dampen out any vibrations that would otherwise occur. As the glass sheet, suspended from the carriage, is moved into the quench, it is guided and prevented from swinging, by guides of a type that will not mar the surface of the heated sheet.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

FIG. 1 is a view taken on line 1—1 of FIG. 2,

FIG. 2 is a view taken on line 2—2 of FIG. 1,

FIG. 3 is an enlarged view of the guide for the glass sheet,

FIG. 4 is an enlarged view of the rail upon which the glass travels,

FIGS. 5 and 6 are views of modified forms of carriage, and

FIG. 7 is a section of a different form of guide.

Referring to the drawings, there is shown a rail 1 upon which the glass is carried during the tempering operation. This rail is provided with a flange forming tracks 2 upon which wheels 3 of a carriage 4 move as the glass is being carried from one position to another along its path of travel. There are provided a number of carriages, with those carriages used for a single sheet of glass usually being connected by means of a bar 5. Tongs 6 are attached to the bar 5, and in a conventional manner support a sheet of glass 7 to be treated, with the glass being suspended as shown in FIG. 1.

During the tempering process the glass is heated to a temperature slightly above its critical temperature in a furnace 8 and is then moved horizontally into position in a quench 9. The dotted line 10 in FIG. 2 indicates diagrammatically the shape of rail 1 and the path through which the carriages 4 will move along the rail. Ordinarily the carriages are moved to carry the glass through the furnace and then to the quench with one carriage following another so that one sheet of glass can be heated while another sheet is being quenched. The carriages then travel around the rail so that the tempered glass can be unloaded and a new sheet placed into the tongs in preparation for being moved into the furnace.

As the carriages move along rail 2 there is ordinarily enough vibration to shake the glass sheet and cause it to swing sideways. In addition, this vibration causes the points of the tongs to place undesirable stresses in the surface of a cold sheet and to dig deeply into the surface of the hot glass sheet with the result that many sheets are cracked or broken as they are moving through the furnace and from the furnace to the quench. In order to overcome this disadvantage which is encountered with most tempering apparatus, there is provided herein a resilient or shock absorbing strip that is placed on the rails 2 and upon which the wheels 3 travel. Preferably the rails 2 are cleaned to present a suitable upper surface. To this surface there is cemented a resilient strip 11, that is preferably rubber, upon which the wheels 3 travel. The heat from the furnace will raise the temperature of the rail to the neighborhood of 200 to 250° F. so that the strip must be of a material which will withstand this temperature. Normally the strip will extend around the entire loop formed by rail 10 as indicated by the dotted line 10 in FIG. 2. In some cases, however, it is only necessary that the resilient strip be placed on the tracks 2 from a point where the glass is hung on the tongs in front of the entrance of furnace 8 to a point beyond the exit of quench 9.

The quench is shown herein somewhat diagrammatically and may be of any conventional type. The quench 9 includes a pair of wind boxes 12 that are disposed on opposite sides of the path through which the glass moves. Each of these boxes is provided with a plurality of nozzles 13 through which jets of air are forced against the sheet of glass. In order to obtain good tempering it is necessary that these nozzles be disposed opposite each other so that the opposite sides of the glass will be evenly chilled. Frequently the wind boxes are moved in a circular path in order to improve the coverage of the glass by the cooling jets. Air is supplied to the wind boxes from any suitable source through supply pipes 14.

As the hot glass is moved horizontally from the furnace to a position between the wind boxes, care must be taken to keep it from swinging. This swinging could be due to the travel of the carriages along the track although, with the resilient means here provided, such swinging will not ordinarily take place. Swinging, however, can be produced, and frequently is, by the action of the jets on the glass as the sheet is initially moved between them. This swinging cannot only cause damage to the glass but can produce an uneven tempering pattern. In order to avoid this, there are provided guides 15 which are spaced closely adjacent to each side of the sheet of glass. As shown herein there are four guides 15, two adjacent to the top of the sheet and two adjacent to the bottom thereof. These guides extend in a horizontal direction parallel to the travel of the sheet and preferably about one quarter of an inch from the sheet. Each of the guides is attached at one end to an anchor 16 located between the furnace and quench. Each anchor is slightly curved as shown in the drawing, so that the glass will be directed into the space between the guides. Each guide includes a wire 17, such as piano wire, which is fastened permanently on one end to anchor 16 and at the other end to a tensioning member 18 by means of a clamp 19. The wire is covered by a relatively soft metal that may take the form of a tube 21. The covering, or tube, is preferably of aluminum, since this metal will withstand the temperatures encountered and will not mar the glass surfaces at these temperatures. The tube is preferably one quarter inch in diameter and is cut away at one end as shown at 22, so that a portion thereof can extend beyond member 18 to continue to guide the sheet of glass until after it has passed completely beyond the end of the quench.

Other ways of resiliently isolaitng the glass supporting devices from the rail 1 can also be used. One such alternative is shown in FIG. 5. In this form, carriage 4 is shown as having a wheel with a metal hub 23 which has on it a resilient tire 24 that rolls along the surface of track 2. The resilience of the tire, which may be rubber, absorbs the vibrations that would ordinarily be transmitted to the glass.

Another way of absorbing vibrations is disclosed in FIG. 6. In this figure, bar 5 is shown as being provided with a bolt 25 which extends upwardly through an opening in carriage 4 that is larger in diameter than the bolt. Surrounding the bolt are a thick rubber block 26, a metal washer 27 and a nut 28. The bar 5 and the parts carried thereby are thus isolated from carriage 4 by the rubber block 26 that serves to absorb any vibration that would be produced by travel of the carriage along the track.

Another form of guide that can be used to hold the glass steady in the quench is shown in FIG. 7. Support for the guide is provided by a pair of thin metal strips 29 that are attached at one end to anchor 16 and at the other end to tensioning member 18. A guide member 31 of a temperature resistant material such as asbestos strip is held between strips 29 by fasteners 32. The edge of strip 31, projecting beyond supports 29, will not harm the hot glass, but will prevent it from swinging while it is moving into and held in the quench.

In the operation of the apparatus, a sheet of glass is attached to a number of tongs 6 while in a position ahead of the furnace, is moved into the furnace, and is heated evenly to a temperature of about 1200° F. When the glass has been heated it is moved rapidly and smoothly along the rails to a position between wind boxes 12. Here the glass is struck on both sides by the jets of air from nozzles 13 and is cooled to below about 100° F. The material which forms the surface of the guides 15, is such that when the heated glass passes it, the guide will not mar the glass surface. From time to time the tubes 21, if they are used, or strips 31, will have to be replaced. This is easily accomplished by releasing the clamp 19, removing the guide from anchor 16, and substituting a new one. When the support 17 or 29 has been reattached to member 18, this member can be rotated in any suitable manner in order to place the support under sufficient tension so that the guide will be taut.

It will be seen that the use of the resilient members on the tracks of the rail will insure that the carriages will move smoothly and without vibration while they are carrying hard glass to and soft glass from the furnace to the quench. This, in combination with the guides which prevent swinging of the glass, insures that the glass will be moved into the quench without any strain on its surface that would tend to warp or mar the surface and will insure that the glass is held accurately in position during the time that the quenching action takes place.

While in accordance with the provisions of the Statutes I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. Apparatus for tempering glass sheets comprising a furnace to heat the glass, a quench having opposed sides to cool the glass, a carriage having means thereon to suspend a sheet of glass below the carriage, a rail upon which said carriage is mounted for movement, said rail extending in a path such that a carriage thereon will move a glass sheet through said furnace and between the sides of said quench, resilient means between said suspending means and rail operative to cushion the travel of said carriage and the glass sheet suspended therefrom as the carriage moves the sheet through the furnace and into the quench, and elongated guide means extending parallel to the direction of movement of said carriage between and beyond the sides of said quench and on opposite sides of and adjacent to the path through which the glass sheet moves operative to prevent swaying of the glass sheet as said quench operates upon the same, said guide means being made of material that is softer than the surface of glass heated to tempering temperature.

2. In apparatus for tempering glass sheets, a rail extending through a path including a heating station and a quenching station, means on said rail forming a track, a carriage supported for movement on said track, glass supporting means carried by said carriage whereby glass can be moved along said track from in front of said heating station to beyond said quenching station, said carriage being provided with wheels traveling on said track, resilient means between said track and carriage to cushion the travel of said carriage and the glass carried thereby as it moves between and through said stations, said resilient means being a strip of resilient material attached to said track and on which said wheels travel.

3. In apparatus for tempering glass sheets, a rail extending through a path including a heating station and a quenching station, means on said rail forming a track, a carriage supported for movement on said track, glass supporting means carried by said carriage whereby glass can be moved along said track from in front of said heating station to beyond said quenching station, said carriage being provided with wheels traveling on said track, said wheels being provided with resilient tires that engage said track to cushion the travel of said carriage and the glass carried thereby as it moves between and through said stations.

References Cited

UNITED STATES PATENTS

| | | | |
|---|---|---|---|
| 2,160,065 | 5/1939 | Ford | 65—349 |
| 2,194,760 | 3/1940 | Long | 65—349 |
| 2,247,289 | 6/1941 | Despret | 65—114 |
| 3,214,007 | 10/1945 | Matthies et al. | 198—195 |

DONALL H. SYLVESTER, *Primary Examiner.*

A. D. KELLOGG, *Assistant Examiner.*